United States Patent
Nozawa

(10) Patent No.: US 7,551,835 B2
(45) Date of Patent: Jun. 23, 2009

(54) IMAGE PICKUP APPARATUS

(75) Inventor: Shingo Nozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 803 days.

(21) Appl. No.: 10/724,762

(22) Filed: Dec. 2, 2003

(65) Prior Publication Data

US 2004/0119842 A1    Jun. 24, 2004

(30) Foreign Application Priority Data

Dec. 13, 2002   (JP)   ............... 2002-362088

(51) Int. Cl.
*H04N 5/91*   (2006.01)
*H04N 7/26*   (2006.01)
*H04N 7/01*   (2006.01)

(52) U.S. Cl. .................. 386/83; 386/109; 386/111; 386/131

(58) Field of Classification Search ............. 386/111, 386/112, 109, 83, 131; 375/240.26; 348/700
See application file for complete search history.

(56) References Cited

U.S. PATENT DOCUMENTS 5,774,624 A * 6/1998 Enari .................. 386/111
6,057,893 A * 5/2000 Kojima et al. ........... 348/700
6,556,627 B2 * 4/2003 Kitamura et al. ........ 375/240.26

FOREIGN PATENT DOCUMENTS

JP   2001-251631 A   9/2001

OTHER PUBLICATIONS

Japan Office Action, issued Aug. 29, 2006 for corresponding Japanese application No. 2002-362088.

* cited by examiner

*Primary Examiner*—Thai Tran
*Assistant Examiner*—Hung Q Dang
(74) *Attorney, Agent, or Firm*—Fitzpatrick, Cella, Harper & Scinto

(57) ABSTRACT

A recorder adapted to encode a moving picture signal using an MPEG method to record the resultant encoded moving picture signal to transmit the encoded moving picture signal to the outside of the recorder, wherein in accordance with an instruction to start a recording operation issued in the middle of transmission of the encoded moving picture signal, the recording operation is started from a frame corresponding to the instruction to start the recording operation, and a picture structure of a GOP after start of the recording operation is changed from a picture structure of the GOP before issue of the instruction to start the recording operation.

8 Claims, 6 Drawing Sheets

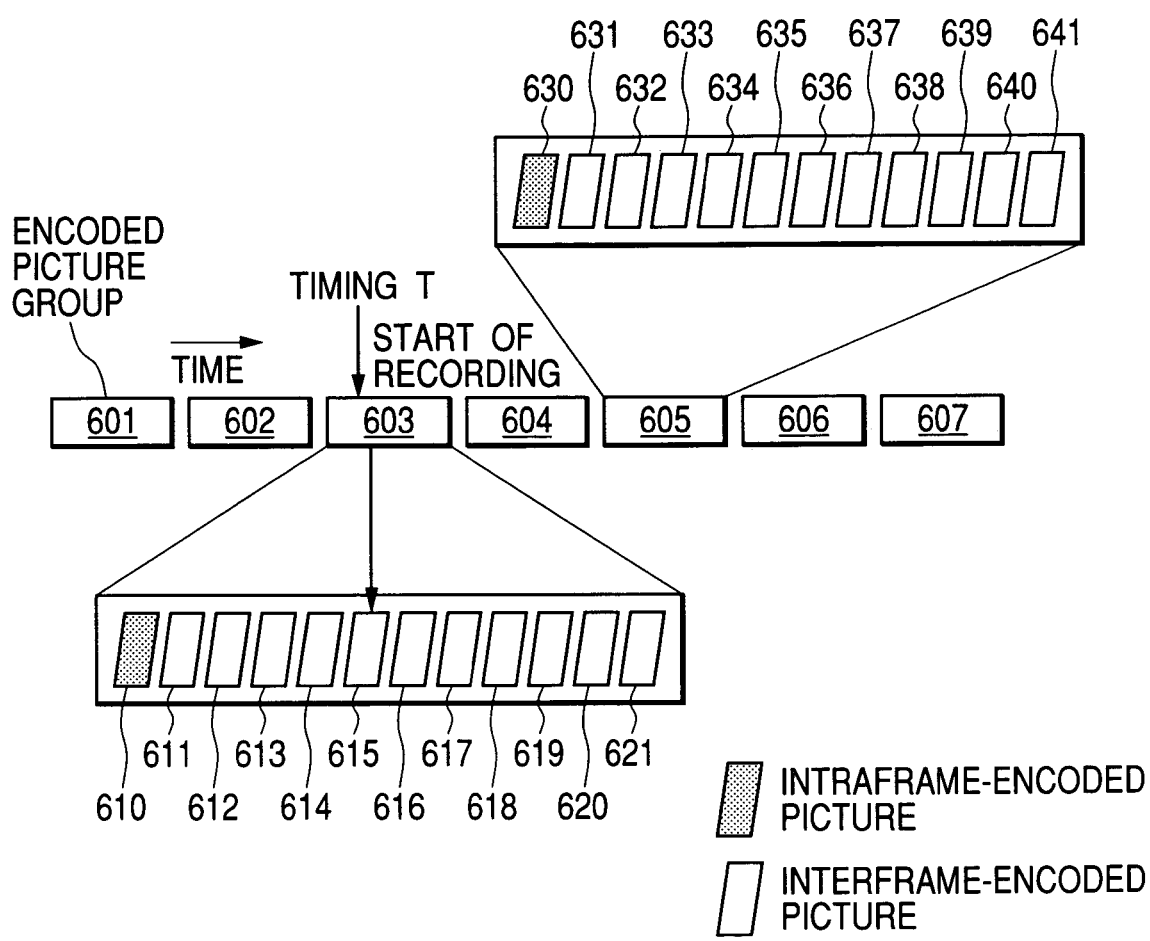

IMAGE PICKUP APPARATUS

BACKGROUND OF THE INVENTION

1. Field of the Invention

The present invention relates to an image pickup apparatus for capturing a video image.

2. Related Background Art

In recent years, it has become possible through the development of the digital signal processing technique that a large quantity of information including moving pictures, still pictures, or voices is digitally encoded with high efficiency to be recorded in a small magnetic recording medium or a small optical recording medium or to be transmitted to a communication medium. With the further development of such a technique, an image pickup apparatus has been developed which can readily capture a high quality image of an object to immediately output the resultant image signal to a communication medium.

Recently, an MPEG (Moving Picture Expert Group) encoding technique has been widely used for the encoding of a moving picture. FIG. 5 is an example of an image pickup apparatus using the MPEG encoding technique. An image signal of an image picked up by an image pickup unit 501 is supplied to an MPEG encoding unit 502. As for the MPEG encoding, an intraframe encoding method of encoding using a correlation within the same frame, and an interframe encoding method of encoding using a correlation between a preceding frame and a subsequent frame are used.

FIG. 6 is a diagram showing an example of a structure of encoded data output from the MPEG encoding unit 502. In FIG. 6, reference numerals 610 and 630 denote intraframe-encoded I pictures, respectively. In addition, reference numerals 611 to 621, and 631 to 641 denote interframe-encoded pictures, respectively, which contain P pictures predictive interframe-encoded in a forward direction, and B pictures predictive interframe-encoded in a bidirection. These pictures are collectively output in the form of picture groups 601 to 607 each having a predetermined number of pictures and classification. At least one I picture is contained in one picture group, and other interframe-encoded pictures are reproduced on the basis of information of the I picture.

An image signal encoded in such a manner is supplied to a recording unit 503 to be saved in an arbitrary recording medium 504. In addition, at the same time, the encoded image signal is supplied to a communication unit 505 to be transmitted to the outside of the image pickup apparatus through a stream output terminal 506. In such an image pickup apparatus, not only an image signal can be saved in a recording medium, but also the stream output terminal can be connected to a computer or a television so that the image pickup apparatus can be utilized for various kinds of applications such as an image delivery and a visual telephone.

A case is considered where in the image pickup apparatus shown in FIG. 5, an instruction to start recording an image signal onto the recording medium 504 is issued in the middle of transmission of an encoded image signal through the stream output terminal 506, e.g., an instruction to start a recording operation is issued at a timing T in FIG. 6, i.e., at a timing corresponding to a picture 615 within the picture group 603.

In this case, an image signal is recorded on the recording medium 504 from the interframe-encoded picture 615 in the middle of the picture group 603. In the picture groups shown in FIG. 6, such a structure is adopted that each of the picture groups contains one I picture at a head of the picture group. Thus, when the image signal is recorded in the middle of the picture group 603, the intraframe-encoded I picture 610 of the picture group 603 remains not recorded and is lacked. As a result, though the intraframe-encoded pictures 615 to 621 contained in the picture group 603 are properly recorded, these pictures 615 to 621 cannot be properly decoded.

As a result, in such a prior art example, a problem arises in that a picture group which can not be properly decoded is almost, surely generated right after start of each image capture, and hence during a reproduction time period of a head picture group, an image is caused to be frozen.

In order to avoid this problem, as in U.S. Pat. No. 5,774,624, such a technique was proposed that a picture group is newly generated in accordance with an instruction to start a recording operation, and no matter what timing the recording is started, an I picture is always included in a head picture group.

When the technique described in U.S. Pat. No. 5,774,624 is used, an image signal recorded on a recording medium can be properly reproduced from a head. However, as for the encoded data output from the MPEG encoding unit 502 to the stream output terminal, when an instruction to start a recording operation is issued in the middle of the picture group, the picture group of the stream output signal is divided into parts at this time point. As a result, a P picture required to reproduce a B picture, for example, may be lacked in some cases, and hence it is impossible to output an encoded image signal which can be reproduced without causing problems in both recording and transmission.

SUMMARY OF THE INVENTION

It is an object of the present invention to solve the above-mentioned problems associated with the prior art.

It is another object of the present invention to suppress an image lack in reproduction with respect to both a transmitted encoded image signal and a recorded encoded image signal, even when in the middle of transmission of an image signal encoded using the intraframe encoding method and the interframe encoding method, an instruction to record the same image signal is issued.

In order to achieve the above-mentioned object, according to an aspect of the present invention, an image pickup apparatus including: image pickup means; encoding means for encoding a moving picture signal output from the image pickup means using an intraframe encoding method and an interframe encoding method to generate an encoded image signal including therein a plurality of picture groups constituted by an image signal of n frames (n: an integer equal to or larger than two) including intraframe-encoded frames obtained through the intraframe encoding processing and interframe-encoded frames obtained through the interframe encoding process; recording means for recording the encoded image signal generated by the encoding means on a recording medium; and control means for, in accordance with an instruction to start recording of the moving picture signal, controlling the recording means so as to start a recording operation from the image signal of a frame corresponding to the instruction to start the recording operation, and for controlling the encoding means so as to change a structure of the picture groups generated after issue of the instruction to start the recording operation from a structure of the picture groups generated in and before the issue of the instruction to start the recording operation.

Other objects than the above objects of the present invention and their features will become clear by the detailed description of preferred embodiments of the present invention with reference to the accompanying drawings.

BRIEF DESCRIPTION OF THE DRAWINGS

FIG. 6 is a diagram useful in explaining an operation for a processing for recording an image signal executed by the conventional image pickup apparatus.

DESCRIPTION OF THE PREFERRED EMBODIMENTS

Preferred embodiments of the present invention will hereinafter be described in detail with reference to the accompanying drawings.

First Embodiment

Figure 1:
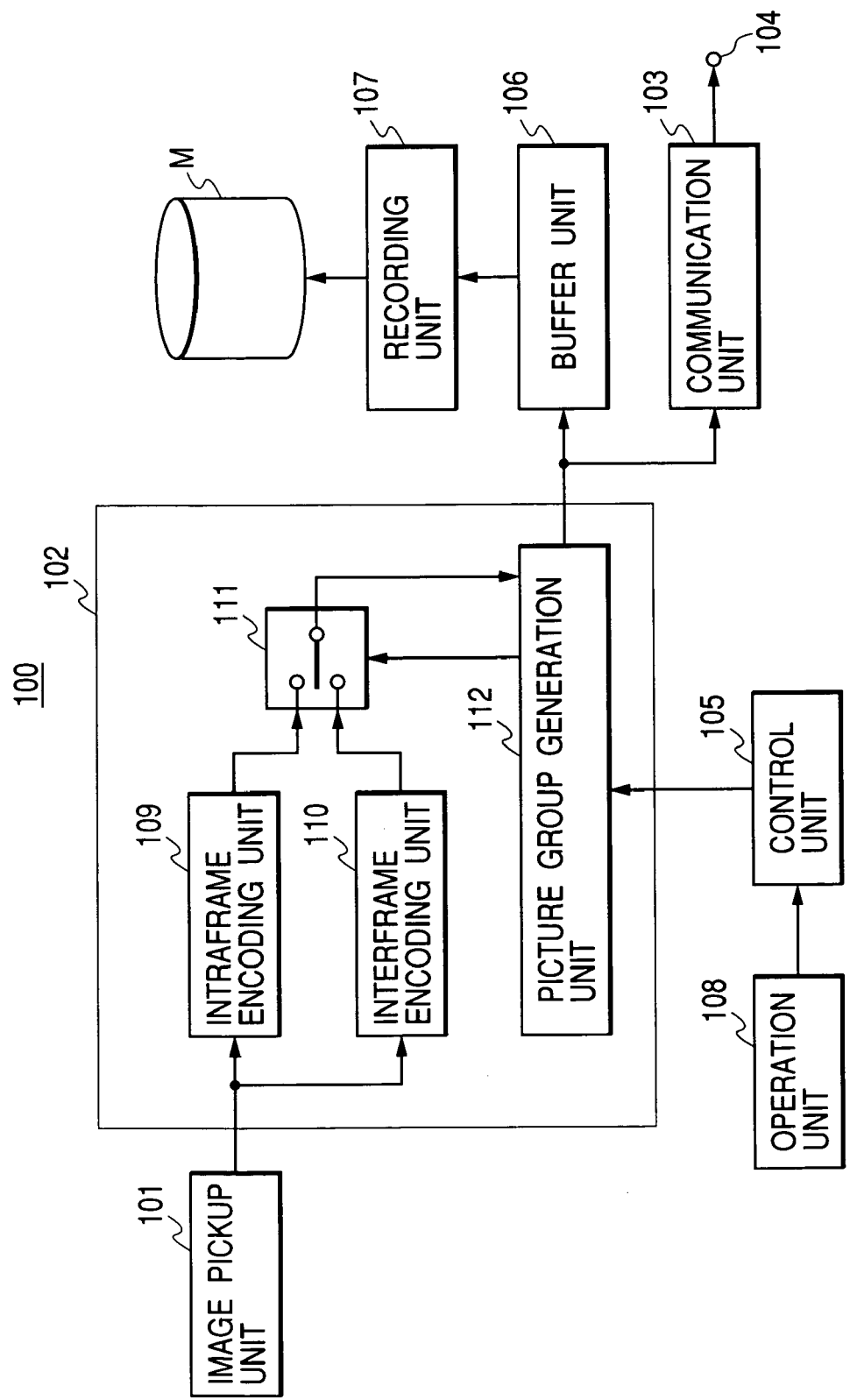
FIG. 1 is a block diagram showing an example of a configuration of an image pickup apparatus according to a first embodiment of the present invention.

FIG. 1 is a block diagram showing an example of a configuration of an image pickup apparatus 100 according to a first embodiment of the present invention.

In FIG. 1, reference numeral 101 denotes an image pickup unit; 102, an encoding unit; 103, a communication unit; 104, a stream output terminal; 105, a control unit; 106, a buffer unit; 107, a recording unit; and 108, an operation unit.

The image pickup unit 101 picks up an image of an object to supply a resultant image signal to the encoding unit 102. The encoding unit 102 encodes the supplied image signal using the MPEG method to supply the encoded image signal to the communication unit 103 and the buffer unit 106.

The encoding unit 102 includes therein an intraframe encoding unit 109, an interframe encoding unit 110, a selector 111, and a picture group generation unit 112. An image signal is supplied from the image pickup unit 101 to the intraframe encoding unit 109 and the interframe encoding unit 110. The intraframe encoding unit 109 encodes the image signal using a correlation within the same frame of the image signal. The interframe encoding unit 110 encodes the image signal using a correlation between a preceding frame and a subsequent frame of the image signal.

The image signals, which is encoded by the intraframe encoding unit 109 and the interframe encoding unit 110, respectively, are then supplied to the selector 111. The picture group generation unit 112 supplies a change-over signal to the selector 111 in accordance with a control signal issued from the control unit 105 to select either the encoded image signal output from the intraframe encoding unit 109 or the encoded image signal output from the interframe encoding unit 110. The selected encoded image signal is then supplied to the picture group generation unit 112. The picture group generation unit 112 collects the supplied encoded image signals of a predetermined number of frames to structure one picture group, which is in turn supplied to the buffer unit 106 and the communication unit 103.

The communication unit 103 converts the encoded image signal supplied from the picture group generation unit 112 into a form suitable for a transmission line to output the resultant image signal to an external device or apparatus, e.g., a telephone monitor or a computer through the stream output terminal 104.

The communication unit 103 has an interface circuit corresponding to the stream output terminal 104 and outputs an encoded image signal in accordance with a predetermined protocol. As for the stream output terminal 104, an arbitrary terminal, such as an IEEE1394 terminal or a USB terminal, capable of outputting an image signal can be utilized.

The control unit 105 includes a CPU, a ROM and a RAM, for example, and carries out the control for the whole image pickup apparatus by executing a program stored in the ROM. A picture group generation processing as well, which will be described below, is realized by the control unit 105 executing the program to control the necessary units. Of course, a configuration may also be adopted in which a part of or all of the processing is processed by hardware.

The recording unit 107 modulates an encoded picture group stored in the buffer unit 106 in accordance with a predetermined recording method to record the modulated encoded picture group on the recording medium M. As for the recording medium M, an arbitrary recording medium such as a magnetic recording medium or an optical recording medium can be utilized. In the present embodiment, for example, a detachable recording medium such as a magnetic tape or an optical disc is used.

Figure 2:
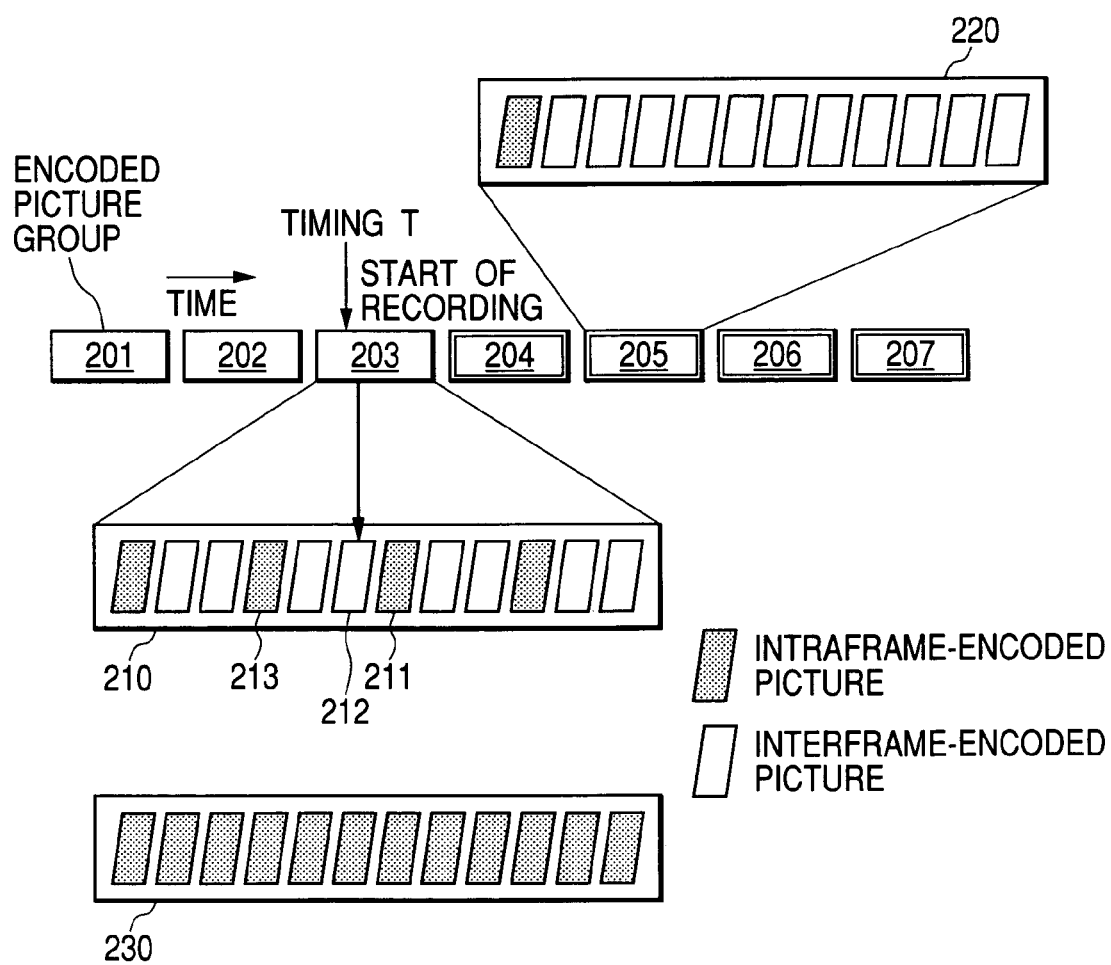
FIG. 2 is a diagram useful in explaining an operation for a processing for recording an image signal executed by the image pickup apparatus according to the first embodiment of the present invention.

The image pickup apparatus according to the present embodiment can, while transmitting the image signal encoded using the MPEG method to the outside of the image pickup apparatus by the communication unit 103, record the image signal encoded in the same manner on the recording medium M by the recording unit 107. Referring to FIG. 2, a description will hereinbelow be given with respect to the operation of the image pickup apparatus of the present embodiment when an instruction to start the recording operation is issued by the operation unit 108 in the middle of transmission of the image signal through the stream output terminal 104.

FIG. 2 is a diagram showing an encoded image signal train output by the encoding unit 102 (more specifically, the picture group generation unit 112), and a structure of a plurality of picture groups constituting this encoded image signal train.

Now, a case is considered where an instruction to start the recording operation is issued at a timing T in FIG. 2, i.e., at a timing corresponding to a picture contained in the picture group 203. Upon reception of the recording instruction issued from the operation unit 108, the control unit 105 controls the picture group generation unit 112 so as to change the picture structure of the picture groups 204 to 207 after the operation for starting the recording, from the picture structure of the picture groups 201 to 203 in and before the operation for starting the recording.

That is, with respect to the structure of the picture groups 204 to 207 after the operation for starting the recording, as shown in a portion 220, one frame at a head is an intraframe-encoded picture, and the rest of the frames are interframe-encoded pictures, whereas with respect to a structure of the picture groups 201 to 203 in and before the operation for starting the recording, as shown in a portion 220, a plurality of intraframe-encoded pictures are inserted in one picture group. In the portion 210 of FIG. 2, one frame of an intraframe-encoded picture is inserted every three frames.

As described above, a ratio of the intraframe-encoded pictures in one picture group is larger in the picture groups generated in and before the operation for starting the recording than that in the picture groups generated after the operation for starting the recording.

In the present embodiment, in the picture group 203, the recording operation is started from a frame 212 corresponding to an instruction to start the recording operation. Since the frame 212 is the interframe-coded picture, and a reference frame 213 is not recorded, the frame 212 cannot be properly decoded. However, a frame 211 as a next intraframe-encoded picture can be independently and properly decoded. Thus, since as shown in the portion 210, a plurality of intraframe-encoded pictures are inserted into the picture group 203, the encoded image signal in and after this frame 211 can be properly decoded.

As described above, according to the present embodiment, the structure of the picture groups in and before and after issue of the instruction to start the recording operation is changed so that the number of intraframe-encoded pictures in each of the picture groups before start of the recording operation becomes larger than that in each of the picture groups after start of the recording operation. As a result, it becomes possible to greatly reduce the number of frames that become unreproducable within the picture group containing therein the frame corresponding to the instruction to start the recording operation.

Note that, in the present embodiment, as shown in the portion 210, the intraframe-encoded pictures are inserted at a rate of one every three frames in and before start of the recording operation. However, in addition to this structure, the intraframe-encoded pictures can be inserted at a rate of one every n frames (n is an integer equal to or larger than 2).

However, the intraframe-encoded picture has a larger quantity of codes than that of the interframe-encoded picture. Thus, the instruction rate needs to be determined considering a recording speed of the recording medium M and a transmission rate of a transmission line to which the encoded image signal is output from the communication unit 103.

Therefore, in the case of n=1, as shown in a portion 230 of FIG. 2, the one picture group may also be structured with only the intraframe-encoded pictures in and before the operation for starting the recording.

Second Embodiment

Next, an image pickup apparatus according to a second embodiment of the present invention will be described.

Figure 3:
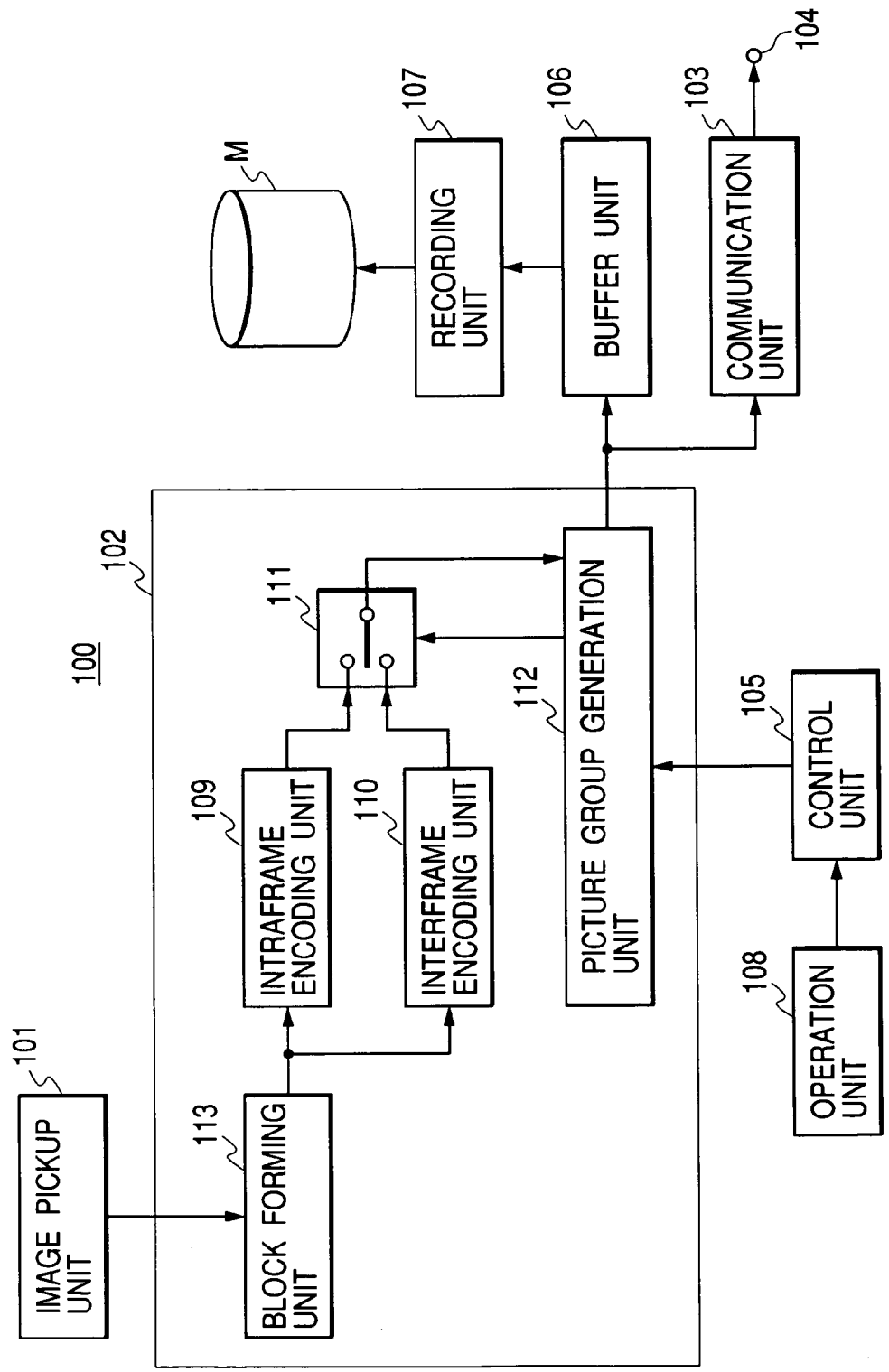
FIG. 3 is a block diagram showing an example of a configuration of an image pickup apparatus according to a second embodiment of the present invention.

FIG. 3 is a block diagram showing a configuration of an image pickup apparatus 100 according to the second embodiment. The same constituent elements as those of FIG. 1 are designated with the same reference numerals, and the description thereof is omitted here for the sake of simplicity.

In the present embodiment, an image signal output from the image pickup unit 101 is input to a block forming unit 113 of the encoding unit 102. The block forming unit 113 divides the input image signal into blocks each having 16 pixels (length)×16 pixels (width) to output the resultant image signal divided into blocks to the intraframe encoding unit 109 and the interframe encoding unit 110.

In the present embodiment, the operation of the encoding unit 102 is different from that of the encoding unit 102 of the first embodiment.

A description will hereinbelow be given with respect to a processing when an instruction to start the recording operation is issued from the operation unit 108 while the encoded image signal is output from the communication unit 103 to an external device or apparatus as described above.

Figure 4:
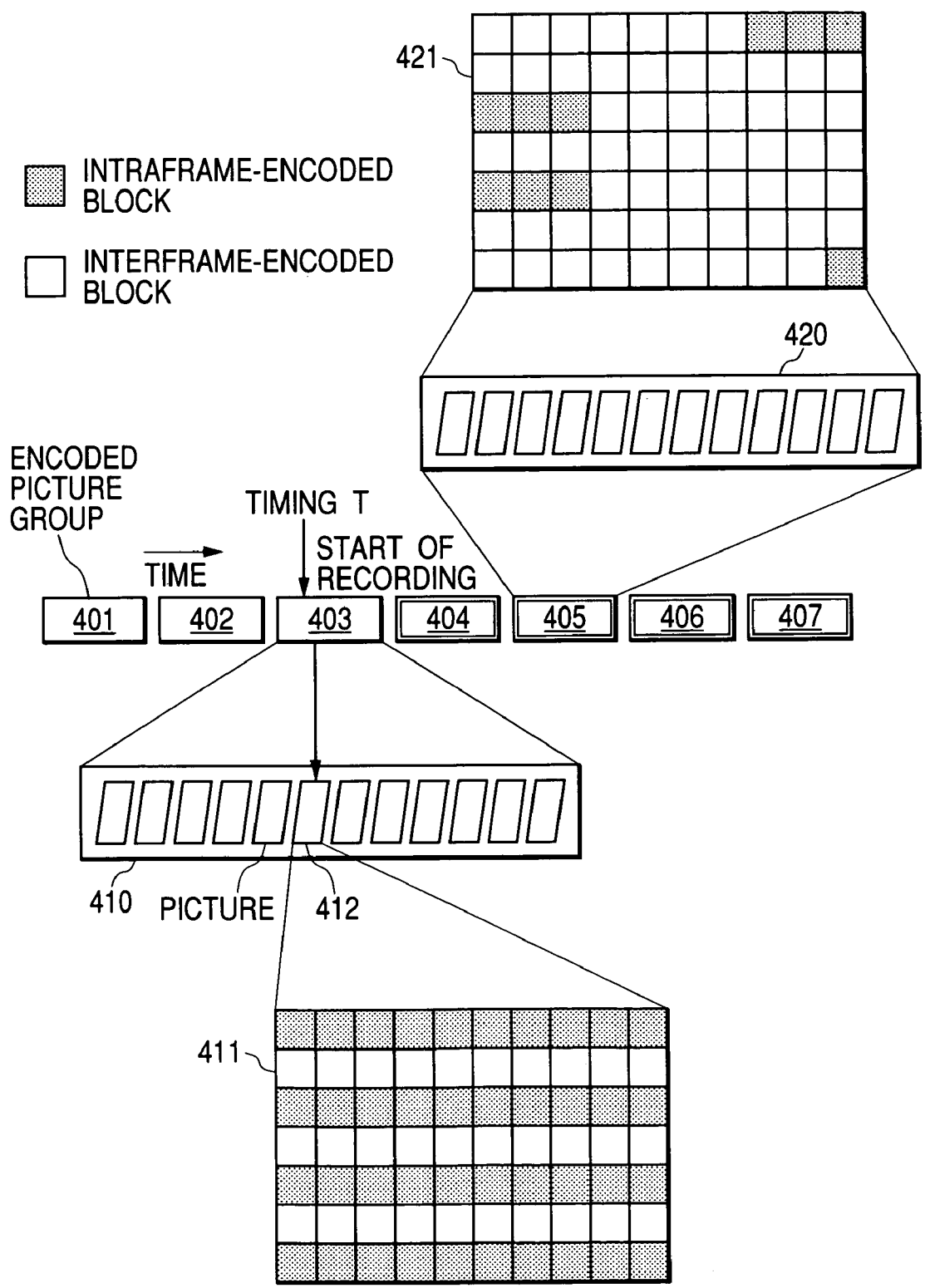
FIG. 4 is a diagram useful in explaining an operation for a processing for recording an image signal executed by the image pickup apparatus according to the second embodiment of the present invention.
Figure 5:
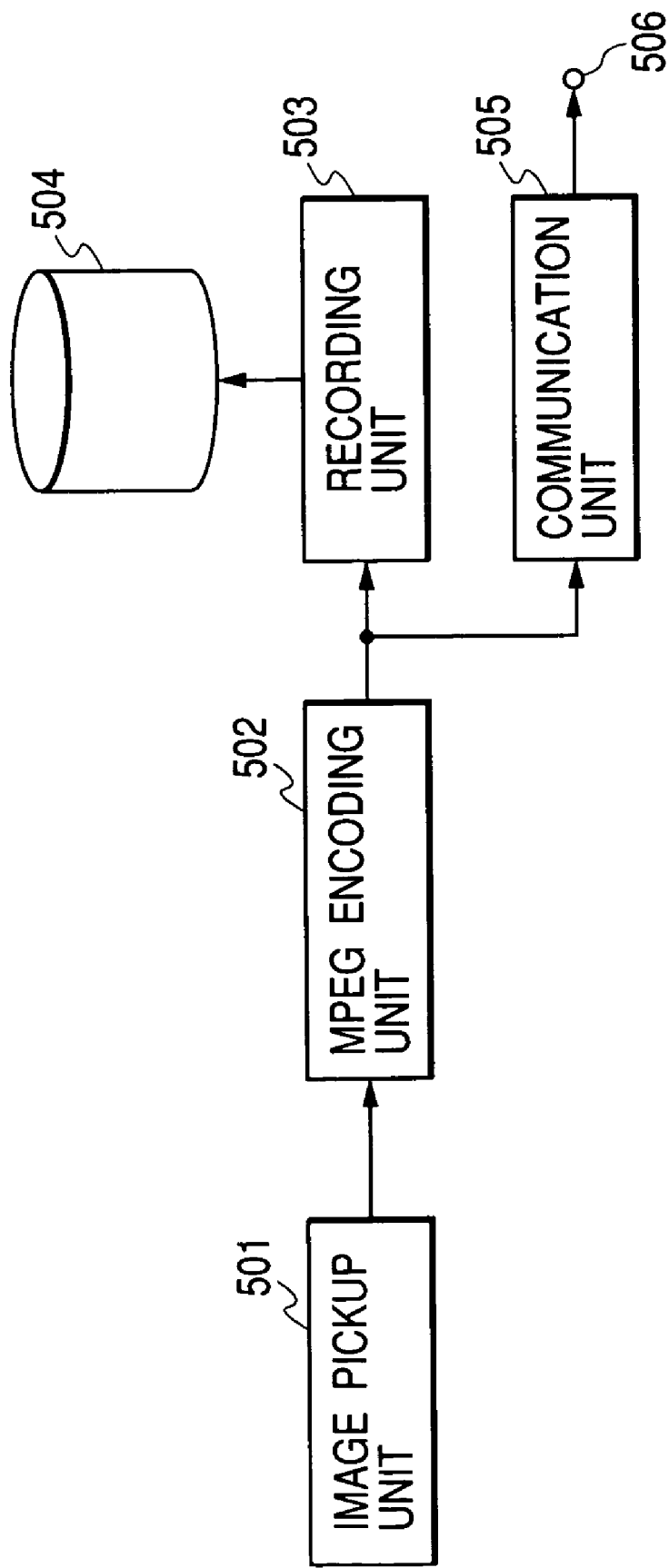
FIG. 5 is a block diagram showing an example of a configuration of a conventional image pickup apparatus.

FIG. 4 is a diagram showing an encoded image signal train output by the encoding unit 102, and a structure of a plurality of picture groups constituting this image signal train.

Now, a case is considered where an instruction to start a recording operation is issued at a timing T in FIG. 4, i.e., at a timing when a frame included in a picture group 403 is being encoded. Upon reception of an instruction to start a recording operation from the operation unit 108, the control unit 105 controls the picture group generation unit 112 so as to change a picture structure of picture groups 404 to 407 after the operation for starting the recording, from a picture structure of the picture groups 401 to 403 in and before the recording start operation.

That is, the structure of the frames of the picture groups 401 to 403 in and before the recording start operation is changed into a structure shown in portions 410 and 411, and the structure of the picture groups 404 to 407 after the recording start operation is changed into a structure shown in portions 420 and 421, whereby the number of intraframe-encoded blocks in the frames of the picture groups in and before the recording start operation is made larger than that in the picture groups after the recording start operation.

In the present embodiment, the recording operation is started from the frame 412, in the picture group 403, corresponding to the instruction to start the recording operation. In the frame 412, each of the blocks encoded through the interframe encoding process fails to be properly decoded since its reference frame is not recorded. However, each of the blocks encoded through the intraframe encoding process can be independently and properly decoded. Each of the frames in the picture group 403, as shown in a portion 411, has a larger number (rate) of intraframe-encoded blocks as compared with each of the frames after the recording start operation. As a result, it is possible to reduce the number of blocks in one frame that cannot be decoded.

As described above, according to the present embodiment, the structure of the picture groups before and after issue of the instruction to start the recording operation is changed so that in each of the picture groups in and after the recording start operation, the number of intraframe-encoded blocks in one frame becomes larger than in each of the picture groups after the recording start operation. As a result, it becomes possible to greatly reduce the number of blocks that become unreproducable within the picture group corresponding to the instruction to start the recording operation.

Other Embodiments

Note that, while in the first and second embodiments, the image pickup apparatus having the image pickup unit is described, the present invention can also be applied to an image pickup apparatus for recording image data of an image captured by an external device or apparatus.

In addition, in the above-mentioned embodiments, the description is given with respect to only the case where each of the picture groups generated by the picture group generation unit 112 after issue of the instruction to start the recording operation has only one intraframe-encoded picture. However, in a case where the number of pictures required to be properly reproduced is smaller than that of all pictures contained in one picture, and such pictures are continuous, such as a case where a plurality of intraframe-encoded pictures are contained in one picture group, the present invention can be applied likewise to the continuous pictures in the lowest units which can be properly reproduced.

In addition, while in the above-mentioned embodiments, only the image pickup apparatus constituted by one apparatus is described, the function equal to that of the image pickup apparatus of the present invention may also be realized by a system constituted by a plurality of apparatuses.

It should be noted that the present invention includes a case as well where the program of a software for realizing the function of each of the above-mentioned embodiments is supplied either directly, or indirectly through wired/wireless communication, to a system or an apparatus having a program capable of executing this program, and then the computer of the system or apparatus executes the supplied program to thereby attain the function equal to that of the image pickup apparatus of the present invention.

Consequently, a program code itself supplied and installed in a computer in order to realize the functional processing of the present invention by the computer concerned is also used to realize the present invention. That is, the computer program itself for realizing the functional processing of the present invention is also included in the present invention.

In this case, any program may be adopted, such as an object code, a program executed by an interpreter, or script data supplied to an OS, as long as a function of a program is obtained.

As for a recording medium for supplying a program, for example, there is a magnetic recording medium such as a flexible disc, a hard disc or a magnetic tape, a photo/magneto-optical storage medium such as an MO, a CD-ROM, a CD-R, a CD-RW, a DVD-ROM, a DVD-R, or a DVD-RW, or a nonvoltile semiconductor memory.

As for a method including supplying a program through wired/wireless communication, there is given a method in which a computer program itself constituting the present invention, or a data file (program data file) capable of becoming a computer program constituting the present invention on a client computer such as a compressed file including an automatic installation function is stored in a server on a computer network, and the program data file is downloaded to a client computer having a connection made thereto. In this case, it is also possible that a program data file is divided into a plurality of segment files, and the resultant segment files are arranged in different servers, respectively.

That is, a server device for downloading a program data file for realizing a functional processing of the present invention by a computer to a plurality of users is also included in the present invention.

In addition, it is also possible that a program of the present invention is enciphered to be stored in a recording medium such as a CD-ROM to be widely distributed to users, and key information used to solve encipherment is downloaded from a home page through the Internet, for example, to be supplied to users each meeting predetermined conditions, and the enciphered program is extended by using the key information to be installed in a computer.

Also, a computer executes a read-out program to thereby realize the functions of the above-mentioned embodiments. In addition to this operation, an OS or the like being operated on a computer executes a part of or all of an actual processing in accordance with an instruction of that program, and the functions of the above-mentioned embodiments can also be realized on the basis of the execution of a part of or all of the actual processing.

Moreover, after a program read out from a recording medium has been written to a memory included in a function extended board inserted into a computer, or a function extended unit connected to a computer, a CPU or the like included in the function extended board or the function extended unit executes a part of or all of an actual processing in accordance with an instruction of that program, and the functions of the above-mentioned embodiments can also be realized on the basis of the execution of a part of or all of the actual processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   image pickup means;
   encoding means for encoding a moving image signal output from the image pickup means using an intra-encoding method and an inter-encoding method to generate an encoded image signal including an intra-encoded picture encoded by the intra-encoding method and an inter-encoded picture encoded by the inter-encoding method,
   the encoding means extracting an image signal of a picture for every n pictures (n being an integer greater than or equal to two) from the moving image signal and encoding the extracted image signal by the intra-encoding method, thereby generating the intra-encoded picture for every n pictures, and
   the encoding means encoding image signals of a plurality of pictures included between each consecutive pair of the intra-encoded pictures extracted for every n pictures, by one of the intra-encoding method and the inter-encoding method;
   recording means for recording the encoded image signal generated by the encoding means on a recording medium;
   transmission means for transmitting the encoded image signal generated by the encoding means to an external apparatus; and
   control means for controlling the encoding means and the recording means in accordance with an instruction to start a recording operation, issued during transmission of the encoded image signal by the transmission means, to change a number of the intra-encoded pictures interposed between the consecutive pairs of the intra-encoded pictures extracted for every n pictures so that the encoding means does not change the intra-encoding of the intra-encoded pictures extracted for every n pictures even if the instruction to start the recording operation is issued.

2. An image pickup apparatus according to claim 1, wherein the control means further controls the encoding means to reduce the number of the intra-encoded pictures interposed between the consecutive pairs of the intra-encoded pictures extracted for every n pictures so that the encoding means does not change the intra-encoding of the intra-encoded pictures extracted for every n pictures even if the instruction to start the recording operation is issued.

3. An image pickup apparatus comprising:
   image pickup means;
   encoding means for encoding a moving image signal output from the image pickup means using an intra-encoding method and an inter-encoding method to generate an encoded image signal including an intra-encoded picture encoded by the intra-encoding method and an inter-encoded picture encoded by the inter-encoding method,
   the encoding means extracting an image signal of a picture for every n pictures (n being an integer greater than or equal to two) from the moving image signal and encoding the extracted image signal by the intra-encoding method, thereby generating the intra-encoded picture for every n pictures, and the encoding means encoding image signals of a plurality of pictures included between each consecutive pair of the intra-encoded pictures extracted for every n pictures, by one of the intra-encoding method and the inter-encoding method;

recording means for recording the encoded image signal generated by the encoding means on a recording medium;

transmission means for transmitting the encoded image signal generated by the encoding means to an external apparatus; and control means for controlling the encoding means and the recording means in accordance with an instruction to start a recording operation, issued during transmission of the encoded image signal by the transmission means, to change a rate of the intra-encoded pictures interposed between the consecutive pairs of the intra-encoded pictures extracted for every n pictures so that the encoding means does not change the intra-encoding of the intra-encoded pictures extracted for every n pictures even if the instruction to start the recording operation is issued.

4. An image pickup apparatus according to claim 3, wherein the control means further controls the encoding means to reduce the rate of the intra-encoded pictures interposed between the consecutive pairs of the intra-encoded pictures extracted for every n pictures so that the encoding means does not change the intra-encoding of the intra-encoded pictures extracted for every n pictures even if the instruction to start the recording operation is issued.

5. An image pickup method comprising steps of:

generating a moving image signal;

encoding the moving image signal using an intra-encoding method and an inter-encoding method to generate an encoded image signal including an intra-encoded picture encoded by the intra-encoding method and an inter-encoded picture encoded by the inter-encoding method, the encoding step including extracting an image signal of a picture for every n pictures (n being an integer greater than or equal to two) from the moving image signal and encoding the extracted image signal by the intra-encoding method, thereby generating the intra-encoded picture for every n pictures, and the encoding step including encoding image signals of a plurality of pictures included between each consecutive pair of the intra-encoded pictures extracted for every n pictures, by one of the intra-encoding method and the inter-encoding method;

recording the encoded image signal on a recording medium;

transmitting the encoded image signal to an external apparatus; and controlling the encoding step and the recording step in accordance with an instruction to start a recording operation, issued during transmission of the encoded image signal in the transmission step, to change a number of intra-encoded pictures interposed between the consecutive pairs of intra-encoded pictures extracted for every n pictures so that the encoding step does not change the intra-encoding of the intra-encoded pictures extracted for every n pictures even if the instruction to start the recording operation is issued.

6. A method according to claim 5, wherein the control step includes controlling the encoding step to reduce the number of the intra-encoded pictures interposed between the consecutive pairs of the intra-encoded pictures extracted for every n pictures so that the encoding step does not change the intra-encoding of the intra-encoded pictures extracted for every n pictures even if the instruction to start the recording operation is issued.

7. An image pickup method comprising steps of:

generating a moving image signal;

encoding the moving image signal using an intra-encoded method and an inter-encoded method to generate an encoded image signal including an intra-encoded picture encoded by the intra-encoding method and an inter-encoded picture encoded by the inter-encoding method, the encoding step including extracting an image signal of a picture for every n pictures (n being an integer greater than or equal to two) from the moving image signal and encoding the extracted image signal by the intra-encoding method, thereby generating the intra-encoded picture for every n pictures, and the encoding step including encoding image signals of a plurality of pictures included between each consecutive pair of the intra-encoded pictures extracted for every n pictures, by one of the intra-encoding method and the inter-encoding method;

recording the encoded image signal on a recording medium;

transmitting the encoded image signal to an external apparatus; and controlling the encoding step and the recording step in accordance with an instruction to start a recording operation, issued during transmission of the encoded image signal in the transmission step, to change a rate of intra-encoded pictures interposed between the consecutive pairs of intra-encoded pictures extracted for every n pictures so that the encoding step does not change the intra-encoding of the intra-encoded pictures extracted for every n pictures even if in a picture group without changing a rate of frames included in the picture group and even if the instruction to start the recording operation is issued.

8. A method according to claim 7, wherein the control step includes controlling the encoding step to reduce the rate of the intra-encoded pictures interposed between the consecutive pairs of the intra-encoded pictures extracted for every n pictures so that the encoding step does not change the intra-encoding of the intra-encoded pictures extracted for every n pictures even if the instruction to start the recording operation is issued.

* * * * *